United States Patent [19]
Hendriks

[11] Patent Number: 6,091,570
[45] Date of Patent: Jul. 18, 2000

[54] ARCHITECTURE FOR GUIDING THE AIR FLOW IN A DISK STORAGE DEVICE

[75] Inventor: Ferdinand Hendriks, Yorktown Heights, N.Y.

[73] Assignee: International Business Machines Corporation, Armonk, N.Y.

[21] Appl. No.: 09/135,954

[22] Filed: Aug. 18, 1998

[51] Int. Cl.[7] ................................................ G11B 33/14
[52] U.S. Cl. ................................................ 360/97.03
[58] Field of Search ........................ 360/97.02, 97.03, 360/104, 106

[56] References Cited

U.S. PATENT DOCUMENTS

| | | | |
|---|---|---|---|
| 4,583,213 | 4/1986 | Bracken et al. | 360/97.02 |
| 4,725,904 | 2/1988 | Dalziel | 360/97.02 |
| 5,031,059 | 7/1991 | Yamaguchi et al. | 360/97.03 |
| 5,631,787 | 5/1997 | Huang et al. | 360/97.02 |
| 5,636,082 | 6/1997 | Shibuya et al. | 360/97.02 |
| 5,696,649 | 12/1997 | Boutaghou | 360/97.03 |
| 5,907,453 | 5/1999 | Wood et al. | 360/97.02 |
| 5,956,203 | 9/1999 | Schirle et al. | 360/97.03 |

FOREIGN PATENT DOCUMENTS

| | | | |
|---|---|---|---|
| 61-196494 | 8/1986 | Japan | 360/97.02 |
| 5-174523 | 7/1993 | Japan | 360/97.02 |

*Primary Examiner*—Jefferson Evans
*Attorney, Agent, or Firm*—Whitham, Curtis & Whitham; Stephen C. Kaufman, Esq.

[57] ABSTRACT

A disk drive assembly enclosed in a housing, having a head disk assembly including a spindle, disks axially attached to the spindle, a driving motor for rotating the spindle, a read/write head, and a carriage assembly including a positioning arm, slider mechanism and a actuator/suspension mechanism. The slider mechanism is slidably attached to the positioning arm and the actuator suspension mechanism is attached to the positioning arm. The read/write head for reading or writing information to the disks is attached to the head positioning assembly at the slider mechanism. A fairing is attached to the positioning arm. The head positioning assembly is enclosed within the skimmer structure. The skimmer structure has a plurality of slots for receiving the disks of the disk pack. As the disks of the disk pack pass through the slots of the skimmer structure air is stripped away from the disks.

14 Claims, 3 Drawing Sheets

ARCHITECTURE FOR GUIDING THE AIR FLOW IN A DISK STORAGE DEVICE

BACKGROUND OF THE INVENTION

1. Field of the Invention

The invention generally relates to hard disk file units and more particularly to the configuration of a head disk unit within the hard disk file unit.

2. Description of the Prior Art

Conventional hard disk drives include disks that have recording tracks concentrically spaced on each disk surface. Several of these disks are stacked and mounted on a spindle and subsequently called a disk pack. The disk pack is enclosed in a clean enclosure called the disk drive housing.

As the disks spin at very high speed, read/write elements or heads read information from or record information to the recording tracks on the spinning disks. Each read/write element is associated with a single disk.

Typical head disk assemblies include a read/write element (read/write head) carried on a slider. The slider is suspended from a positioning arm. A servo controlled actuator system connected to the positioning arm electrically moves the slider suspended from the arm across the disk surface from recording track to recording track. The actuator may be either a linear or rotary type. A portion of the positioning arm is flexible and acts as a flexible suspension attached slider and read/write head. A number of such arm/suspension/slider assemblies (hereafter referred to collectively as a head positioning assembly)can move in unison to access multiple disk surfaces. When the disk pack and head positioning assembly are maintained in operational relation to each other in the housing the assembly is known as the head disk assembly.

The rotational speed of the disk pack is limited by such factors as rotational drag, and aerodynamic drag on components. For example, without the head positioning assembly the disks inside the housing spin relatively freely, encountering relatively little air resistance because the rotational air flow is unobstructed. A significant portion of the air near the axis of the disk pack spins in nearly solid body rotation in relation to the disks. Air immediately adjacent to each disk surface is pumped outward by centrifugal forces. There is an accompanying flow in a radial plane between each disk, referred to as return flow, that carries air from the outer perimeter of the disk pack back toward the hub of the spindle.

In some head disk assemblies the spindle hub is vented to facilitate air movement. In these vented assemblies the air introduced at the hub gains angular momentum as it is pumped outward, resulting in a smoother air flow, but at the expense of a greater rotational torque. The work done by the spindle manifests itself as aerodynamic dissipation (heat) inside the head disk assembly and causes the internal temperature of the head disk assembly to rise. This occurs, especially, when the air inside the head disk assembly is recirculated. Therefore, low internal aerodynamic dissipation is desirable to maintain low operational temperatures. Unfortunately, it is difficult to achieve low dissipation.

The resulting rise in internal head disk assembly temperature is undesirable for a number of reasons. One reason is that increased outgassing of materials can later contribute to unfavorable head/disk interactions.

Typical systems that allow air flow through solve the aforementioned temperature problem by constantly filtering and taking in new air. The new air exhausts past components being cooled, such as voice coil motors. The newly introduced air gains angular momentum from the disks, which is subsequently destroyed by radially exhausting the air. Unfortunately, flow-through type systems and the aforementioned method of venting the spindle hub sap energy from the spindle motor.

The head positioning assembly can be a major source of aerodynamic dissipation within the head disk assembly. In conventional disk drives the head positioning assembly partially blocks the air flow circulation inside the disk pack. This partial obstruction leads to an aerodynamic wake adjacent to the trailing edge of the head positioning assembly. The Reynolds number based on the circumferential speed, the distance between the disks, and the kinematic viscosity of the air is such that the flow between the disks is turbulent and thus unsteady. Reynolds numbers are dimensionless numbers corresponding to fluid flow characteristics such as turbulent or laminar flow.

Turbulent air flow causes vibrations in the head positioning assembly, known in the art as "buffeting". In some head disk designs, air flow induced vibrations may exhibit an oscillation that is unstable for small amplitudes, but limited at some finite amplitude, usually by non-linear effects. These aero-elastic vibrations are known in the art as "flutter". Buffeting and flutter disturb the positioning system, causing data errors to occur while reading from or writing to the disks.

A primary disk assembly objective is increasing hard disk storage capacity while maintaining or reducing the drive's volume, i.e. increasing the volumetric storage density. Increasing the volumetric storage density requires using thin disks that are more susceptible to being moved by the air flow. This phenomenon is known as aerodynamic excitation. In the case of thin flexible disks, aerodynamic excitation causes disk bending which can cause servo positioning errors that make it more difficult to increase track density.

Another disk assembly objective is to rotate the disks faster thereby increasing the speed that information can be transferred to/from the disks. The increased rotational speed allows information to be either written to the disks faster or information to be retrieved more quickly from the disks. However, spinning the disks faster intensifies the aerodynamic interference within the disk enclosure.

Low aerodynamic dissipation is even more desirable in limited power applications, e.g. laptop computers. Reducing the aerodynamic dissipation within the hard drive reduces the associated operational motor load so that power consumption decreases, thereby extending laptop battery life.

There is therefore a need for reducing aerodynamic dissipation and aerodynamic interference in a head disk assembly.

SUMMARY OF THE INVENTION

It is an object of this invention to improve rotational motion of internal air with minimal aerodynamic dissipation in a high speed disk drive.

It is another object of this invention to improve head positioning assembly resistance to flutter or buffeting caused by high speed air flow.

The present invention is a skimmer structure used to lower aerodynamic dissipation in a hard disk drive by effectively shielding the head positioning assembly from high speed air flow in the disk pack and a fairing attached to the head positioning assembly to promote laminar flow about the head positioning assembly.

A skimmer structure is provided which has slots in one side of a housing for receiving the disks of a disk pack and an internal cavity which houses a head positioning assembly. When the skimmer structure is employed, the disks of the disk pack rotate and pass through the skimmer structure via the disk slots. As the disks rotate, air between the disks gains rotational momentum causing rotational air flow which flows with nearly the same angular velocity as the disks. As the disks pass through the skimmer structure slots the associated rotational air flow encounters the skimmer structure and is subsequently stripped away from the disks.

A conduit formed by the skimmer structure and the housing wall ducts air stripped or diverted away from the disks around the head positioning assembly, reintroducing the stripped air into the disk pack. Also, the diverted air cools other disk drive parts and may be filtered to remove vapors and particle contaminants.

Additionally, the head positioning assembly is constructed or modified to reduce the turbulence associated with conventional head positioning assemblies. A fairing is added to the head positioning assembly which promotes laminar air flow about the fairing and the head positioning assembly. Alternately, the head positioning assembly may be constructed to have a shape which promotes laminar air flow about the assembly. The fairing or integral shaping of the head positioning assembly can be used in conjunction with or independently of the skimmer structure to obtain the best results for lowering aerodynamic dissipation within the hard disk drive.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

Figure 1:
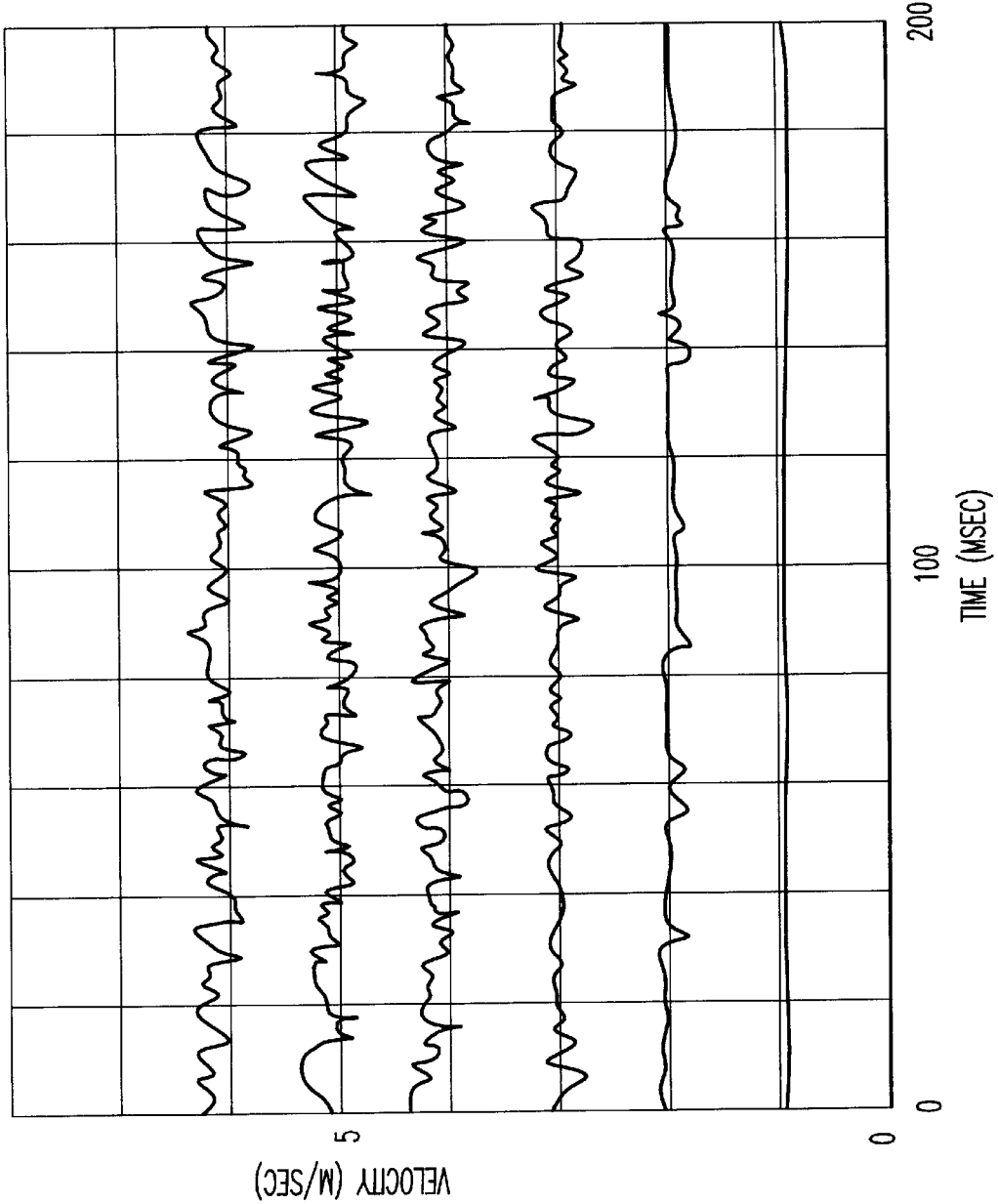
FIG. 1 shows a graph of a constant temperature anemometer signal.
Figure 5:
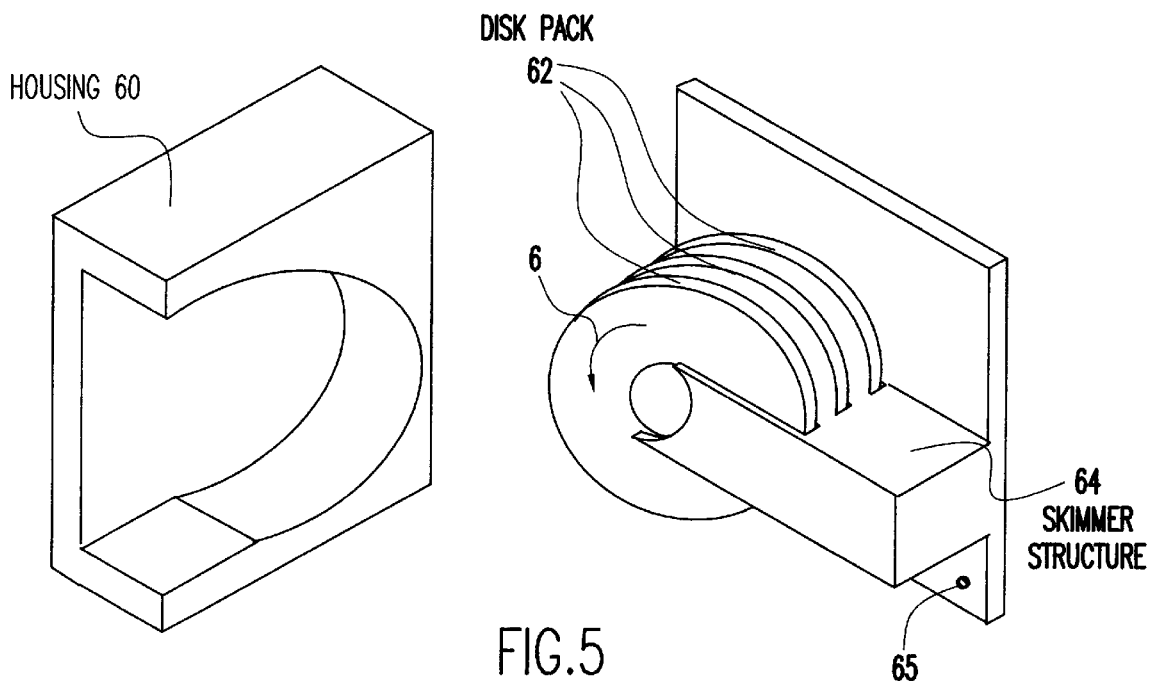
FIG. 5 is an isometric view of one embodiment of the head disk assembly.

FIG. 1 is a reproduction of a photograph of an oscillographic plot of the instantaneous speed of air at the center of a preferred embodiment exhaust nozzle. In FIG. 5 this measurement is taken at a point 65.

The oscilloscope trace at the bottom of the Y-axis and extending along the X-axis of the oscillographic plot in FIG. 1 corresponds to zero air speed while the uppermost trace on the Y-axis corresponds to a mean air speed of 10 meters per second. The air speed increase between each trace is 2 meters per second.

Figure 2A:
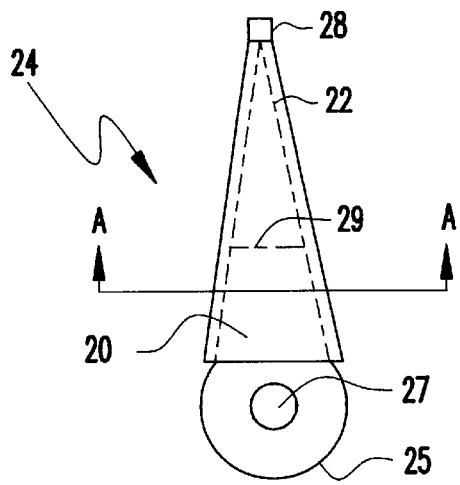
FIG. 2A shows a top view of a streamlined head positioning assembly.

FIG. 2A shows an arm 20 and slider 28 of head positioning assembly 24 fitted with a fairing 26 that envelops arm 20, wherein suspension 22 is a flexible portion of arm 20 that extends from dashed line 29 and supports the slider 28. The arm 20 is connected to actuator 25 which pivots around point 27. The fairing 26 may be of any cross-sectional or longitudinal shape which prevents flutter or buffeting due to aerodynamic turbulence and may be attached to the head positioning assembly by any suitable means (e.g. epoxy, thermosetting resin, screws).

In the preferred embodiment, the arm 20 is manufactured with a streamlined cross-sectional shape eliminating the need for a separately attached fairing 26. Preferably, all parts of the head positioning assembly 24 are shaped to reduce aerodynamic drag.

Figure 2B:
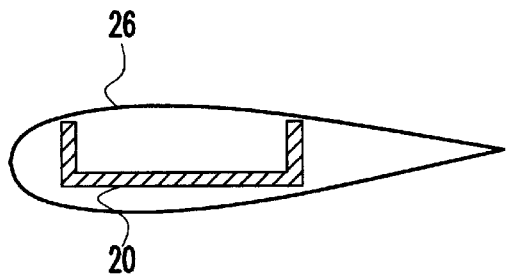
FIG. 2B is a cross-sectional view of the head positioning assembly taken along line A—A in FIG. 2A.

FIG. 2B shows a cross-sectional view, along line A—A in FIG. 2A, of the streamlined fairing 26 and arm 20. The airfoil shaped fairing 26 envelopes the arm 20 to provide optimum air flow about the arm 20.

Figure 3:
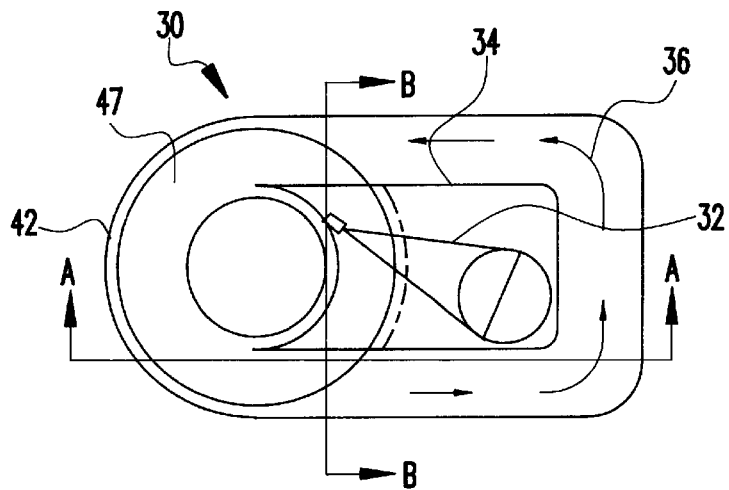
FIG. 3 is a schematic diagram of the disk pump arrangement for the head disk assembly air flow.

FIG. 3 shows the preferred embodiment of the disk pump air flow arrangement of head disk assembly 30. Head positioning assembly 32 is shielded by skimmer structure 34 which diverts the high speed air flow, represented by arrows 36, while maintaining the airflow energy level. The air flow 36 is ducted around the head positioning assembly 32 and passed back into the disk pack 47.

Figure 4A:
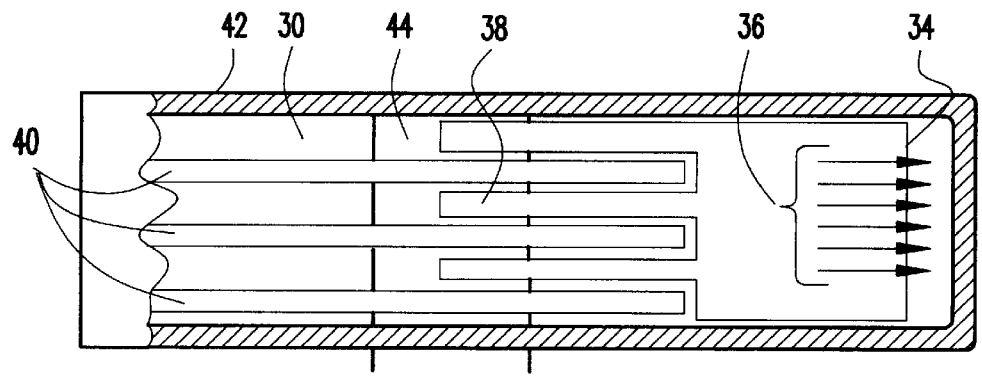
FIG. 4A is a cross-sectional view along line A—A of the disk pump in FIG. 3.

FIG. 4A is a cross-section of the preferred embodiment disk pump of FIG. 3 through line A—A, showing the slots 38 of the skimmer structure 34 which receive the disks 40 of the disk pack 47. The diverted air flow 36 is ducted between the skimmer structure 34 and the housing 42. Preferably, the skimmer structure 34, and disk slots 38 are maintained in as close a relation to the spindle 44 and the disks 40 as mechanical tolerances will allow, thus forming a non-contact seal, which is well known in the art. Maintaining a non-contact seal between the skimmer structure 34, the disk slots 38, the spindle 44, and the disks 40 allows an optimal amount of rotational air flow 36 to be skimmed and ducted around the skimmer structure 34. Preferably, the skimmed air flow 36 is also filtered as it is ducted around the skimmer structure 34.

Since the rotational air flow is skimmed and diverted around the head positioning assembly the aerodynamic wake adjacent to the head positioning assembly is substantially reduced. Additionally, by changing the ducting path the air stripped from the disk pack may be ducted to almost any portion of the hard disk or other component, such as an arm actuator, that requires cooling.

Figure 4B:
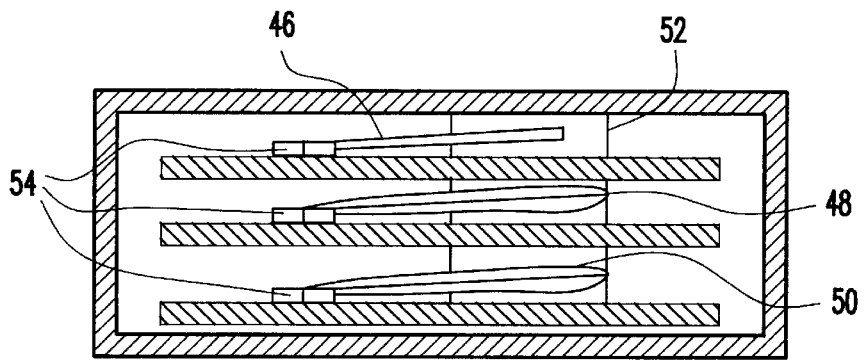
FIG. 4B is a cross-sectional view along line B—B of the disk pump in FIG. 3.

FIG. 4B shows the cross-sectional view of the disk pump in FIG. 3 taken along line B—B. A portion of the head positioning assembly is shown wherein the arms 46, 48, 50 extend from the actuator 52. All of the arms 46, 48, and 50 support read/write heads 54. Arms 48 and 50 are shown equipped with a fairing while arm 46 is shown without a fairing for comparison.

Depending on the design considerations and requirements of a hard disk unit either FIG. 4A or FIG. 4B embodiments may be used. For example, the preferred embodiment of the skimmer structure shown in FIG. 4A requires precise tolerances for the skimmer structure, while the preferred embodiment for the fairing requires the actuator to move additional mass associated with the fairing; therefore, if additional parts requiring high degrees of tolerance are required then the FIG. 4B fairing embodiment may be more desirable.

FIG. 5 shows an isometric view of the preferred configuration of the head disk assembly and skimmer structure. The head disk housing 60 fits over the disk pack 62 and skimmer structure 64. The skimmer structure 64 houses the head positioning assembly. The arrow 66 indicates the rotation of the disk pack 62.

While the invention has been described in terms of its preferred embodiments, those skilled in the art will recognize that the invention can be practiced with modification within the spirit and scope of the appended claims.

I claim:

1. A disk drive assembly comprising:
   a disk pack assembly;
   a head positioning assembly mounted adjacent to said disk pack assembly, said head positioning assembly comprising:
   an actuator,
   a plurality of arms connected to said actuator,
   a slider slidably attached to each of said arms, and
   a read/write head connected to each said slider,
   a skimmer structure, said skimmer structure shielding said head positioning assembly from air flow, said head positioning assembly being enclosed in said skimmer structure,
   wherein an air ducting passage is formed adjacent to said skimmer structure and in said housing.

2. The disk drive assembly of claim 1 wherein said disk pack comprises:
   a spindle; and
   a plurality of disks stacked in a stack, said stack axially mounted on said spindle.

3. The disk drive assembly of claim 2, wherein said skimmer structure comprises:
   a skimmer housing;
   a cavity within said skimmer housing for receiving said head positioning assembly; and
   a plurality of slots in said skimmer housing for interleaving with said disks of said disk pack assembly.

4. The disk drive assembly of claim 3 wherein said skimmer structure does not contact said disks such that friction between said disks and said skimmer structure is minimized.

5. A disk drive assembly comprising:
   a disk pack assembly;
   a head positioning assembly mounted adjacent to said disk pack assembly, said head positioning assembly comprising:
   an actuator,
   a plurality of arms connected to said actuator,
   a slider slidably attached to each of said arms, and
   a read/write head connected to each said slider,
   a skimmer structure, said head positioning assembly being enclosed in said skimmer structure,
   wherein an air ducting passage is formed adjacent to said skimmer structure and in said housing,
   wherein said skimmer structure directs air from said disk pack assembly around said head positioning assembly and back into said disk space.

6. A disk drive assembly comprising:
   a disk pack assembly;
   a head positioning assembly mounted adjacent to said disk pack assembly, said head positioning assembly comprising:
   an actuator,
   a plurality of arms connected to said actuator,
   a slider slidably attached to each of said arms, and
   a read/write head connected to each said slider,
   a skimmer structure, said head positioning assembly being enclosed in said skimmer structure,
   wherein an air ducting passage is formed adjacent to said skimmer structure and in said housing,
   wherein said head positioning assembly includes a fairing attached along each of said arms.

7. The disk drive assembly of claim 6, wherein said fairing has a cross-sectional shape of an airfoil.

8. The disk drive assembly of claim 6, wherein said fairing encloses said arm of said head positioning assembly.

9. The disk drive assembly of claim 8, wherein said fairing further encloses a portion of said actuator of said head positioning assembly.

10. The disk drive assembly of claim 8, wherein said read/write head of said head positioning assembly is positioned between a slot of said plurality of slots and a disk within said disk assembly pack.

11. The disk drive assembly of claim 6, wherein said fairing encloses a portion of said head positioning assembly.

12. A disk drive assembly comprising:
    a disk pack assembly;
    a head positioning assembly mounted adjacent to said disk pack assembly, said head positioning assembly comprising:
    an actuator,
    a plurality of arms connected to said actuator,
    a slider slidably attached to each of said arms, and
    a read/write head connected to each said slider; and
    a plurality of fairings,
    wherein each of said plurality of arms has at least one of said plurality of fairings attached thereto.

13. The disk drive assembly of claim 12 wherein said head positioning assembly is enclosed within a skimmer structure comprising:
    a skimmer housing;
    a cavity within said skimmer housing for receiving said head positioning assembly; and
    a plurality of slots for receiving said disks of said disk pack assembly.

14. A skimmer structure adapted for use with a disk drive assembly, said skimmer structure comprising:
    a skimmer housing;
    a cavity within said skimmer housing for receiving a head positioning assembly; and
    a plurality of slots which extend into said skimmer housing,
    wherein said slots allow access to said cavity within said skimmer housing and divert rotational air flow around the head positioning assembly.

* * * * *